(12) United States Patent
Luescher et al.

(10) Patent No.: US 9,694,472 B2
(45) Date of Patent: Jul. 4, 2017

(54) TOOL HOLDER

(71) Applicant: Robert Bosch GmbH, Stuttgart (DE)

(72) Inventors: Bruno Luescher, Zofingen (CH);
Ulrich Mueller-Boysen, Esslingen (DE); Albrecht Kreissig, Stuttgart (DE); Tobias Waibel, Ulm (DE)

(73) Assignee: Robert Bosch GmbH, Stuttgart (DE)

( * ) Notice: Subject to any disclaimer, the term of this patent is extended or adjusted under 35 U.S.C. 154(b) by 239 days.

(21) Appl. No.: 14/383,610

(22) PCT Filed: Jan. 23, 2013

(86) PCT No.: PCT/EP2013/051178
§ 371 (c)(1),
(2) Date: Sep. 8, 2014

(87) PCT Pub. No.: WO2013/131676
PCT Pub. Date: Sep. 12, 2013

(65) Prior Publication Data
US 2015/0108725 A1    Apr. 23, 2015

(30) Foreign Application Priority Data
Mar. 8, 2012 (DE) .................. 10 2012 004 458

(51) Int. Cl.
*B23B 31/18*    (2006.01)
*B23B 31/19*    (2006.01)
(Continued)

(52) U.S. Cl.
CPC .......... *B24B 45/006* (2013.01); *B23B 31/18* (2013.01); *B23B 31/19* (2013.01); *B24B 23/04* (2013.01);
(Continued)

(58) Field of Classification Search
CPC ..... B23B 31/18; B23B 31/19; B23B 2231/40; B24B 23/04; B24B 45/00; B24B 45/006;
(Continued)

(56) References Cited

U.S. PATENT DOCUMENTS 3,596,917 A * 8/1971 Meyer .................... B23B 31/18
279/103
3,599,996 A * 8/1971 Holt ....................... B23B 31/18
279/37
(Continued)

FOREIGN PATENT DOCUMENTS

| CN | 1946517 A | 4/2007 |
|----|-----------|--------|
| CN | 1988983 A | 6/2007 |

(Continued)

OTHER PUBLICATIONS

International Search Report corresponding to PCT Application No. PCT/EP2013/051178, mailed Sep. 18, 2013 (German and English language document) (5 pages).

*Primary Examiner* — Eric A Gates
(74) *Attorney, Agent, or Firm* — Maginot, Moore & Beck LLP (57) ABSTRACT

A tool holder, particularly a hand-held power tool holder, is provided for an oscillating and/or rotational drive of at least one insertion tool. The tool holder includes at least one holder-side fastening element that is provided at least substantially for a coupling with the at least one insertion tool. The tool holder also includes at least one bearing unit provided for movably mounting the at least one holder-side fastening element in a movement at least partially deviating from an axial direction. The movement at least partially deviating from the axial direction of the at least one fastening element is provided at least substantially for creating a fastening force in the axial direction.

7 Claims, 6 Drawing Sheets (51) Int. Cl.
    *B24B 45/00*     (2006.01)
    *B24B 23/04*     (2006.01)
    *B27B 5/30*     (2006.01)
    *B27B 19/00*     (2006.01)
    *B24B 27/08*     (2006.01)

(52) U.S. Cl.
    CPC ............... *B24B 27/08* (2013.01); *B27B 5/30* (2013.01); *B27B 19/006* (2013.01); *Y10T 279/185* (2015.01); *Y10T 279/33* (2015.01)

(58) Field of Classification Search
    CPC ..... B27B 5/30; B27B 11/006; Y10T 279/185; Y10T 279/33
    See application file for complete search history.

(56) References Cited

U.S. PATENT DOCUMENTS

| | | | | |
|---|---|---|---|---|
| 4,032,163 A * | 6/1977 | Holt | ........................ | B23B 31/18 279/118 |
| 5,058,909 A * | 10/1991 | Rudolf | .................... | B24B 23/02 279/8 |
| 5,158,331 A * | 10/1992 | Wesselski | ................ | F16B 2/185 294/89 |
| 5,967,886 A * | 10/1999 | Wuensch | ............... | B24B 45/006 451/356 |
| 9,346,183 B2 * | 5/2016 | Fankhauser | ................ | B27B 5/32 |
| 9,486,887 B2 * | 11/2016 | Fankhauser | ............ | A61B 17/14 |
| 2005/0192585 A1 | 9/2005 | Simmons | | |
| 2008/0190259 A1 | 8/2008 | Bohne | | |
| 2012/0289963 A1 * | 11/2012 | Legrand | ................. | A61B 17/14 606/79 |
| 2014/0110908 A1 * | 4/2014 | Fankhauser | ............ | A61B 17/14 279/141 |

FOREIGN PATENT DOCUMENTS

| | | |
|---|---|---|
| CN | 101347936 A | 1/2009 |
| CN | 201669688 U | 12/2010 |
| DE | 200 03 063 U1 | 5/2000 |

* cited by examiner

TOOL HOLDER

This application is a 35 U.S.C. §371 National Stage Application of PCT/EP2013/051178, filed on Jan. 23, 2013, which claims the benefit of priority to Serial No. DE 10 2012 004 458.5, filed on Mar. 8, 2012 in Germany, the disclosures of which are incorporated herein by reference in their entirety.

BACKGROUND

Tool holders provided for the driving of at least one insert tool in an oscillating and/or rotational manner are already known.

SUMMARY

The disclosure proceeds from a tool holder, in particular a hand-held power tool holder, which is provided for the driving of at least one insert tool in an oscillating and/or rotational manner, having at least one holder-side fastening element which is provided at least substantially for coupling with the insert tool, and having at least one bearing unit which is provided for the purpose of mounting the fastening element so as to be movable into a movement which deviates at least in part from an axial direction.

It is proposed that the movement, which deviates at least in part from an axial direction, of the at least one fastening element is provided at least substantially for the purpose of generating a fastening force in the axial direction. The term "provided" is to be understood in particular as developed, configured, and/or equipped in a special manner.

The term "holder-side" is to be understood in particular in this context as the at least one fastening element being arranged, in particular in a captive manner, in particular at least substantially in the axial direction, on an end of the tool holder which is realized so as to be contactable by and couplable with the insert tool in an at least substantially direct manner and in particular as the at least one fastening element, when connected to the tool holder, being able to be guided through a fastening recess of an insert tool. In a particularly preferred exemplary embodiment, the at least one fastening element is connected in particular at least in part, preferably completely, and in a captive manner to the tool holder and is provided at least substantially for the purpose of remaining connected in particular to the tool holder at least in part, preferably completely, even when the insert tool is removed. In an advantageous manner, loss of the at least one fastening element can be securely prevented as a result. In addition, when the insert tool is fastened in the tool holder by an operator, there is at least one less additional component to handle.

The term "bearing unit" is to be understood in this context in particular as a unit which is provided at least substantially for the purpose of receiving and supporting at least one force of a component to be mounted, in particular of the at least one fastening element. The term "to mount so as to be movable" is to be understood in this context in particular as the bearing unit being provided additionally for guiding a movement of the component to be mounted, in particular of the at least one fastening element, in at least one direction.

The term "axial direction" is to be understood in this context in particular as a direction which extends at least substantially parallel to a drive axis of the tool holder. The term "at least substantially" is to be understood in this context in particular as a deviation which deviates from a predetermined value in particular by less than 25°, preferably by less than 10° and in a particularly preferred manner by less than 5° of the predetermined value. The term "a movement which deviates from the axial direction" is to be understood in this context in particular as a movement along a direction which deviates in particular by at least 30°, in a preferred manner by at least 45°, preferably by at least 60° and in a particularly preferred manner by at least substantially 90° from the axial direction.

The coupling of the at least one fastening element with the insert tool is preferably realized so as to be releasable, in a particularly preferred manner so as to be releasable in a tool-free manner. The term "releasable" is to be understood in this context in particular as "non-destructively separable". The coupling of the at least one fastening element with the insert tool is preferably realized in a non-positive and/or positive locking manner. The term "non-positive or positive locking manner" is to be understood in this case in particular as a holding force being transmitted between two components preferably as a result of a geometric engagement of the components in one another and/or a friction force between the components.

As a result of the development as described in the disclosure, it is possible to achieve, in particular, a flexibly usable tool holder which is provided in particular for coupling with different insert tools, it being possible to achieve an at least substantially tool-free and simple clamping and/or releasing of the insert tool on or from the tool holder. A power tool which includes the tool holder according to the disclosure can be achieved with a preferred high level of operating comfort as a result.

In addition, the disclosure proceeds from a tool holder, in particular a hand-held power tool holder, which is provided for the driving of at least one insert tool in an oscillating and/or rotational manner, having at least one fastening element which is provided at least substantially for coupling with the insert tool.

It is proposed that the tool holder comprises a transforming unit which is provided for the purpose of transforming a relative movement, which deviates at least in part from an axial movement, between the insert tool and the fastening element into a fastening force, which is formed at least substantially by a clamping force F, in the axial direction.

The term "axial movement" is to be understood in this context in particular as a movement which extends at least substantially parallel to the axial direction. The term "relative movement" is to be understood in this context in particular as a movement between at least two components, in particular at least between the insert tool and the at least one fastening element. The term "transform" is to be understood in this context in particular as a change in at least a speed, in particular in a direction and/or in a different parameter which appears sensible to the expert, in particular in a movement. The transforming unit comprises for this purpose in particular a transforming contour, such as, for example, a sliding guide or an inclined face, a lever mechanism or another development which appears sensible to an expert.

As a result, an advantageously simple, rapid, user-friendly and preferably tool-free coupling of the insert tool with the tool holder is able to be achieved, as a result of which a power tool which includes the tool holder according to the disclosure is able to be achieved with a preferred high level of operating comfort.

In addition, it is proposed that the tool holder comprises a further transforming unit which is provided at least substantially for transforming at least one movement in the axial direction into a movement in a direction of the fastening element which deviates from an axial direction. The term "transforming" is to be understood in this context in particular as a change in at least a speed, in particular in a direction and/or in a different parameter which appears sensible to an expert, in particular in a movement.

As a result, a structurally simple, rapid and cost-efficient transforming of the movement in the axial direction into the movement in the direction, which deviates from the axial direction, of the at least one fastening element can be achieved.

In addition, it is proposed that the tool holder includes at least one clamping element which comprises at least one cone-shaped region. The term "cone-shaped" is to be understood in this case in particular as a positive or negative form which is at least approximately circular in different cross sectional planes and which tapers along a direction perpendicular to the cross sectional planes. The term "a negative conical form" is to be understood in particular as a cone-shaped recess, i.e. a material recess, the inwardly turned face of which is in the form of a cone. The term "a positive conical form" is to be understood in particular as an element, the outwardly turned face of which is in the form of a cone. The cone-shaped region extends in the circumferential direction at least substantially completely around the clamping element. However, it is also conceivable for the cone-shaped region to extend in the circumferential direction over at least one, preferably over several part regions, i.e. over circular segments of a circumference of the clamping element.

In a particularly preferred exemplary embodiment, the cone-shaped region is connected integrally, at least in part, to the clamping element. The term "integrally" is to be understood in particular as being connected in a positively bonded manner, for example as a result of a welding process, an adhesive process, a spray-on process and/or a different process which appears sensible to the expert, and/or is to be understood as being advantageously formed in one piece, such as, for example, as a result of production from a casting and/or as a result of production using a single or multiple component injection molding method and in an advantageous manner from a single blank.

A structurally simple and preferred functional development of the clamping element can be achieved, in particular, as a result.

In addition, it is proposed that the at least one cone-shaped region forms, at least in part, the further transforming unit. A sturdy transforming unit which, in a preferred manner, includes few components can be achieved in an advantageously simple and cost-efficient manner as a result.

In addition, it is proposed that the transforming unit includes at least one transforming face of the fastening element. The term "transforming face" is to be understood in this context in particular as a face which is provided at least substantially for transforming a movement and which, for this purpose, comprises a corresponding transforming contour. The term "transforming" is to be understood in this context in particular as a change in at least a speed, in particular in a direction and/or in a different parameter which appears sensible to an expert, in particular in a movement.

A preferred simple, cost-efficient and reliable development of the transforming unit can be achieved as a result.

In addition, it is proposed that the bearing unit is provided for the purpose of mounting the at least one fastening element so as to be movable at least in part into a radial direction relative to a drive axis. In an advantageously simple manner a bearing arrangement, which saves space in particular in the axial direction, of the at least one fastening element and a preferred simple transforming process can be achieved as a result.

In addition, it is conceivable for the bearing unit to be provided for the purpose of mounting the at least one fastening element so as to be movable at least in part in the circumferential direction in relation to the drive axis. In this exemplary embodiment, the insert tool which corresponds to the tool holder can comprise fastening elements which are formed by fastening recesses and comprise a larger extension at least substantially in the circumferential direction than the at least one fastening element of the tool holder. In an advantageously simple manner a bearing arrangement, which is space saving in particular in the axial direction, of the at least one fastening element and a preferred simple transforming process can be achieved as a result.

In addition, it is proposed that the bearing unit is provided for the purpose of mounting the at least one fastening element so as to be pivotable at least in part. The term "pivotable" is to be understood in this context in particular as "so as to be rotatable at least in part about at least one axis". In an advantageously simple manner a preferred flexible bearing arrangement of the at least one fastening element and a preferred simple transforming process can be achieved as a result.

In addition, it is proposed that the at least one fastening element projects over a drive shaft at least substantially in the axial direction. The term "projects over" is to be understood in this context in particular as at least one end of the at least one fastening element being arranged in a fastening direction, which extends parallel to the axial direction, at least substantially in front of an end of the drive shaft which faces the insert tool.

The achievement, in particular, as a result is that that the tool holder is able to be utilized for different insert tools. In particular, as a result it is possible in an advantageous manner to dispense with a recess in a fastening region of the insert tool which is arranged at least substantially in a center of the fastening region of the insert tool.

BRIEF DESCRIPTION OF THE DRAWINGS

Further advantages are produced from the following description of the drawing. Three exemplary embodiments of the disclosure are shown in the drawing. The drawing and the description include numerous features in combination. In an expedient manner, the expert will also observe the features individually and combine them to form sensible further combinations.

The drawing is as follows.

DETAILED DESCRIPTION

Figure 1:
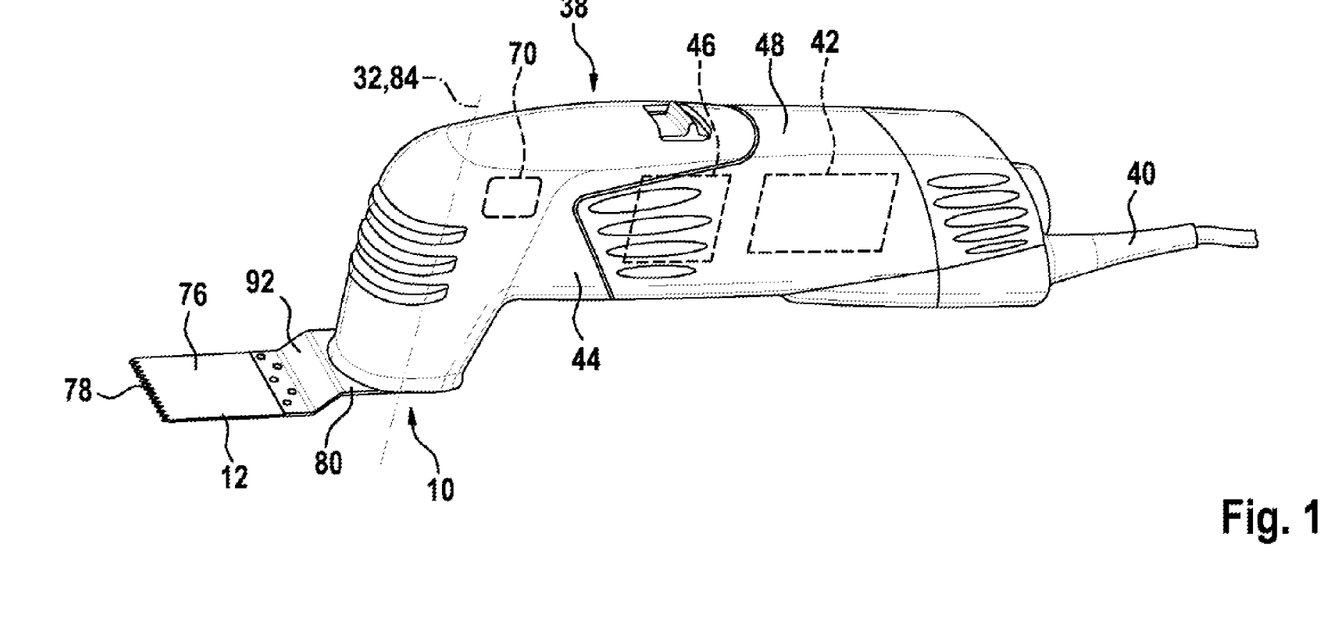
FIG. 1 shows a schematic side view of a hand-held power tool having a tool holder according to the disclosure and an insert tool coupled thereto.

FIG. 1 shows a hand-held power tool 38. The hand-held power tool 38 is formed by an oscillating hand-held power tool. The hand-held power tool 38 is formed by an electric hand-held power tool and comprises a power cable 40. The hand-held power tool 38 includes a drive unit 42 which is surrounded by a housing 44 and which is able to be supplied via the power cable 40 with electric voltage. In addition, the hand-held power tool 38 comprises a transforming unit 46. The transforming unit 46 is arranged between the drive unit 42 and a tool holder 10. The housing 44 of the hand-held power tool 38 comprises a handle region 48 where an operator is able to grasp the housing 44 and guide the hand-held power tool 38 when in operation.

Figure 2:
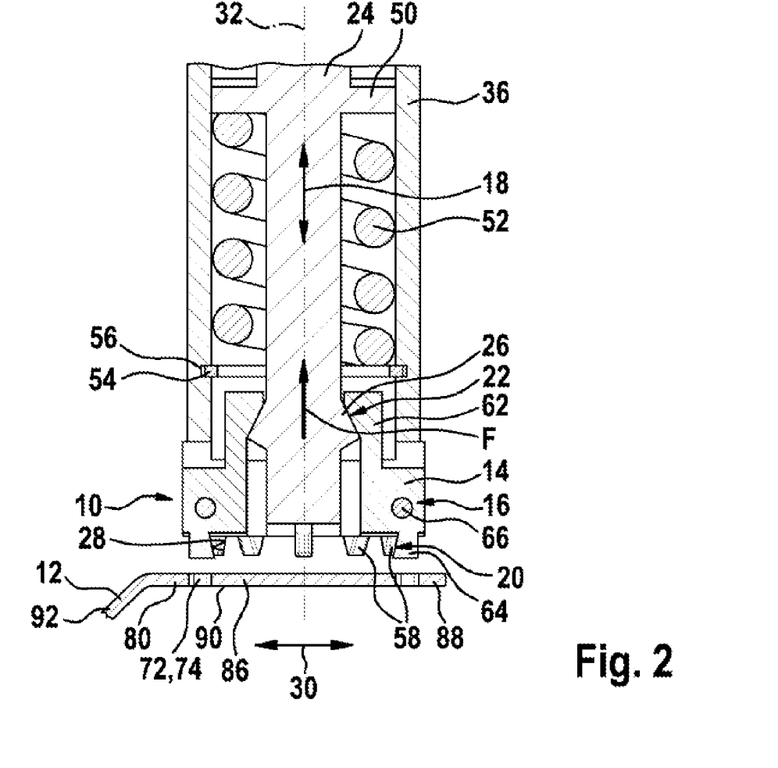
FIG. 2 shows a sectional representation of the tool holder according to the disclosure.
Figure 3:
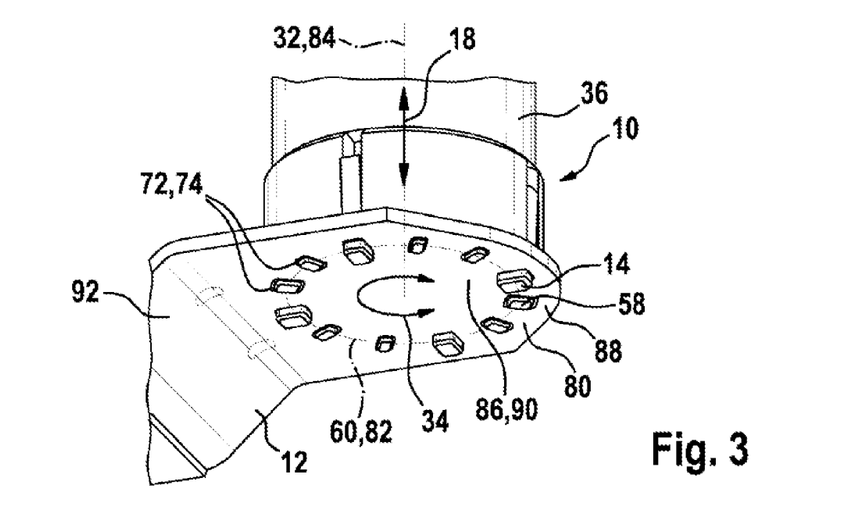
FIG. 3 shows a perspective view of the tool holder according to the disclosure having an insert tool coupled thereto.

FIG. 2 shows the tool holder 10 of the hand-held power tool 38 which is provided for the driving of at least one insert tool 12 in an oscillating and/or rotational manner. The tool holder 10 is formed by a hand-held power tool holder. The hand-held power tool 38 comprises a drive shaft 36, which is provided for the purpose of transmitting, in an operating state, a driving movement from the drive unit 42 (not shown in any detail) to the insert tool 12 which is coupled with the tool holder 10. The drive shaft 36 is realized in a hollow cylindrical manner in an end which faces the insert tool 12. In said region, a clamping element 24 of the tool holder 10 surrounds the drive shaft 36 in the circumferential direction 34. The clamping element 24 comprises a support element 50 which extends outward in the radial direction 30 over a circumference of the clamping element 24. A spring element 52 is supported in the axial direction 18 on the support element 50 of the clamping element 24. The spring element 52 is formed by a helical spring. The spring element 52 is formed by a compression spring. The spring element 52 is supported on an end which faces the insert tool 12 on a support element 54 of the drive shaft 36 which is arranged radially inside the drive shaft 36. The support element 54 is held in the axial direction 18 in a groove 56 in the drive shaft 36. The spring element 52 loads the clamping element 24 away from the insert tool 12 in the axial direction 18 by means of the support element 50 of said clamping element.

The clamping element 24 comprises a cone-shaped region 26. The cone-shaped region 26 is arranged in the axial direction 18 in a region of the clamping element 24 which is remote from the drive unit 42. When viewed from the drive unit 42 toward the insert tool 12, the cone-shaped region 26 is arranged after the support element 54 of the drive shaft 36 in the axial direction 18. The cone-shaped region 26 extends outward in the radial direction 30. A small diameter of the cone-shaped region 26 is arranged facing the drive unit 42 in the axial direction 18.

The tool holder 10 comprises a fastening element 14 which is arranged on the holder side and is provided for coupling with the insert tool 12. The tool holder comprises four fastening elements 14 which are arranged on the holder side and are provided for coupling with the insert tool 12. In addition, the tool holder 10 comprises further fastening elements 58 which are provided for transmitting a driving movement to the insert tool 12. The fastening elements 14 are arranged in a circle 60 about a drive axis 32 of the drive shaft 36. The fastening elements 14, when viewed in the radial direction 30, are arranged inside the drive shaft 36 and outside the clamping element 24. The fastening elements 14 comprise a region 62 which faces the support element 50, the surface of which is realized in an inclined manner with respect to the drive axis 32 and thus forms a negative cone shape. The region 62 extends inward in the radial direction 30. The region 62 corresponds to the cone-shaped region 26 of the clamping element 24. The tool holder 10 comprises a transforming unit 22 which includes the cone-shaped region 26 of the clamping element 24 and the region 62 of the fastening elements 14. The transforming unit 22 is provided for transforming a movement in the axial direction 18 into a movement into a direction, which deviates from the axial direction 18, of the fastening elements 14.

The fastening elements 14 comprise a region 64 which faces away from the support element 50 and is realized in the manner of a pin. The pin-shaped region 64 extends in the axial direction 18 beyond the drive shaft 36 and projects over the drive shaft 36. The fastening elements 14 in each case comprise a transforming face 28 in the pin-shaped region 64. The transforming faces 28 are formed by inclinations which extend in an angled manner with respect to the axial direction 18. The transforming faces 28 form in part a transforming unit 20 of the tool holder 10. The transforming unit 20 is provided for the purpose of transforming a relative movement, which deviates in part from an axial movement 18, between the insert tool 12 and the fastening element 14 into a fastening force in the axial direction 18. The fastening force is realized as clamping force F in the axial direction 18. The transforming faces 28 of the fastening elements 14 transform the pivoting movement of the fastening elements 14, which comprise a movement component in the radial direction 30, into a force with at least one force component in the axial direction which forms the clamping force F. The fastening elements 14 also comprise a central region which is arranged in the axial direction 18 between the region 62 and the pin-shaped region 64.

The tool holder 10 comprises a bearing unit 16 which is provided for the purpose of mounting the fastening element 14 so as to be movable in a direction which deviates in part from an axial direction 18. The movement of the fastening elements 14 which deviate from the axial direction 18 is provided for the purpose of generating the clamping force F in the axial direction 18. The fastening elements 14 are consequently mounted so as to be movable in relation to the drive shaft 36 and to the clamping element 24. The fastening elements 14 are movably mounted in the central region. The bearing unit 16 comprises pin elements 66 which are provided for the purpose of movably mounting the fastening elements 14 in the central region. The bearing unit 16 is provided for the purpose of mounting the fastening elements 14 so as to be movable in part in the radial direction 30 in relation to the drive axis 32. The bearing unit 16 is provided for the purpose of mounting the fastening elements 14 so as to be pivotable. It is also conceivable for the bearing unit 16 to be provided for the purpose of mounting the fastening elements 14 so as to be movable in part or completely in the circumferential direction 34 in relation to the drive axis 32.

Figure 5:
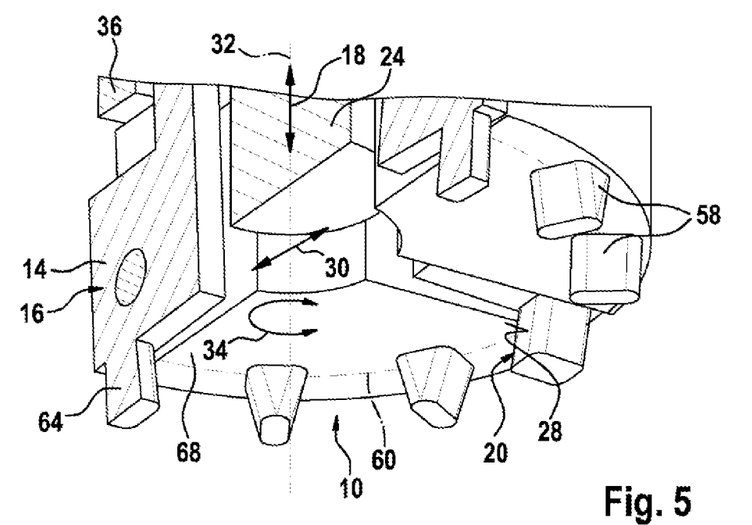
FIG. 5 shows a perspective view of the tool holder according to the disclosure without an insert tool coupled thereto.

The further fastening elements 58 of the tool holder 10 are arranged on an end which faces away from the drive unit 42. The tool holder 10 comprises eight further fastening elements 58. The further fastening elements 58 are arranged in a circle 60 around the drive axis 32 of the drive shaft 36. The circles 60, in which the fastening elements 14 and the further fastening elements 58 are arranged, comprise the same radius. The further fastening elements 58 are realized in a cone-shaped manner. The further fastening elements 58 are connected to one another in each case in pairs by means of ring segment elements 68 (FIG. 5). The further fastening elements 58 are fixedly connected to the ring segment elements 68. The further fastening elements 58 are connected integrally to the ring segment elements 68. The ring segment elements 68 are connected in each case fixedly to the drive shaft 36. The ring segment elements 68 are connected integrally to the drive shaft 36. The fastening elements 14 are arranged evenly between the further fastening elements 58. The fastening elements 14 are arranged in each case between the ring segment elements 68. The tool holder 10 comprises a total of twelve fastening elements 14, 58.

The hand-held power tool 38, which includes the tool holder 10, comprises an actuating element 70 which is not shown in any more detail. The actuating element 70 can be realized as a lever, button or another element known to an expert. As a result of an operator actuating the actuating element 70, the clamping element 24 is moved away from the drive unit 42 in the axial direction 18 in opposition to a force of the spring element 52. As a result, the cone-shaped region 26 of the clamping element 24 and the regions 62 of the fastening elements are guided past one another, as a result of which the fastening elements are displaced in a positive locking manner. The fastening elements 14 are moved as a result into a position in which the pin-shaped regions 64 are arranged parallel to the drive axis 32. In said position, an operator is able to slip the insert tool 12 onto the fastening elements 14 and onto the further fastening elements 58 of the tool holder 10 in the axial direction 18 (FIG. 2). The fastening elements 14 and the further fastening elements 58 reach through corresponding fastening elements 74 of the insert tool 12 which are formed by fastening recesses 72.

Figure 4A:
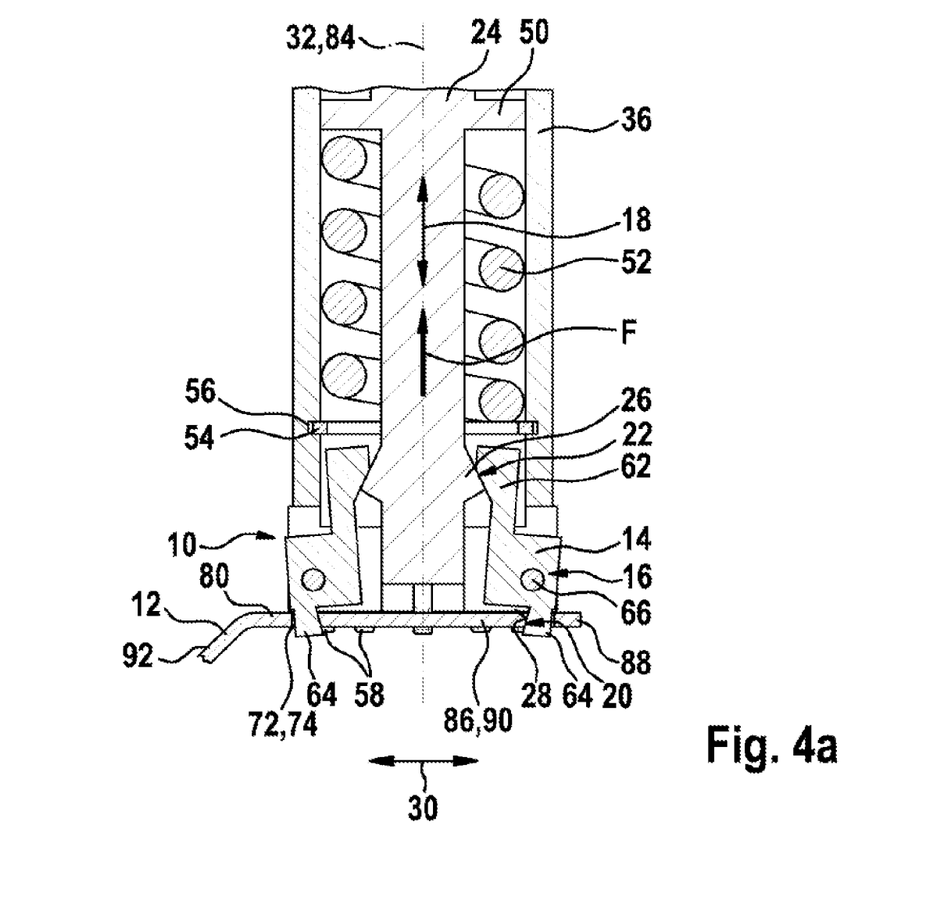
FIG. 4a shows a sectional representation of the tool holder according to the disclosure with an insert tool coupled thereto.
Figure 4B:
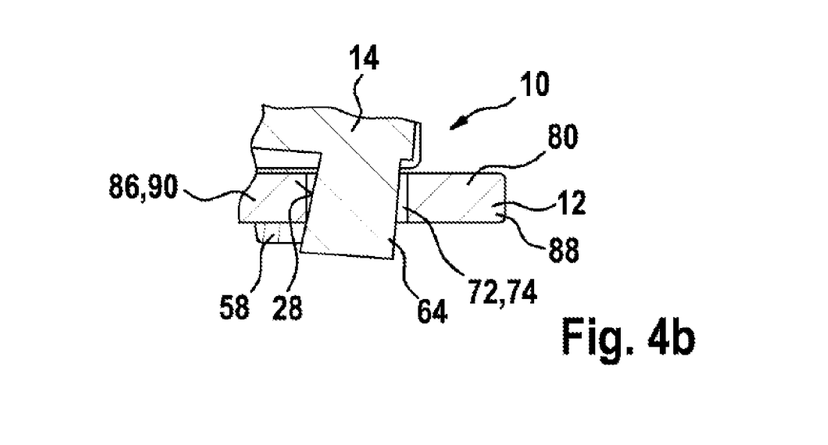
FIG. 4b shows a schematic representation of a detail of the tool holder according to the disclosure.

As a result of the actuating element 70 being triggered or released by the operator, the clamping element 24 is moved by the force of the spring element 52 automatically in the axial direction 18 toward the drive unit 42. As a result, the cone-shaped region 26 of the clamping element 24 and the regions 62 of the fastening elements 14 are guided past one another and press the regions 62 of the fastening elements 14 outward in the radial direction 30 (FIG. 4a). The pin-shaped regions 64 of the fastening elements 14 are moved inward in the radial direction 30 as a result (FIGS. 3, 4a, 4b and 7). With the insert tool 12 mounted on the tool holder 10, as a result of the pivoting movement of the fastening elements 14 in the axial direction 18 the insert tool 12 is clamped on the tool holder 18 and is held in a captive manner. The pivoting movement of the fastening elements 14 brings about a clamping force F in the axial direction 18 onto the insert tool 12. As a result, the insert tool 12 is pressed toward the tool holder 10 and is moved in the axial direction 10 along the further cone-shaped fastening elements 58. With the insert tool 12 completely clamped in the tool holder 10, the further fastening elements 58 abut against the fastening recesses 72 of the insert tool 12 in the radial direction 30 and in the circumferential direction 34. As a result, the further fastening elements 58 secure the insert tool 12 free of torsion play in the radial direction 30 and in the circumferential direction 34. Perpendicular to the axial direction 18, the fastening elements 14 and the further fastening elements 58 comprise a rectangular cross section, the corners of which are realized in a rounded manner.

Figure 6:
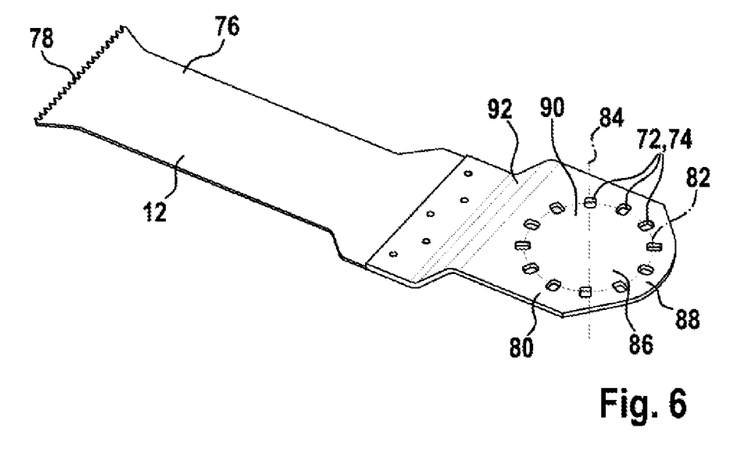
FIG. 6 shows a perspective representation of the insert tool.
Figure 7:
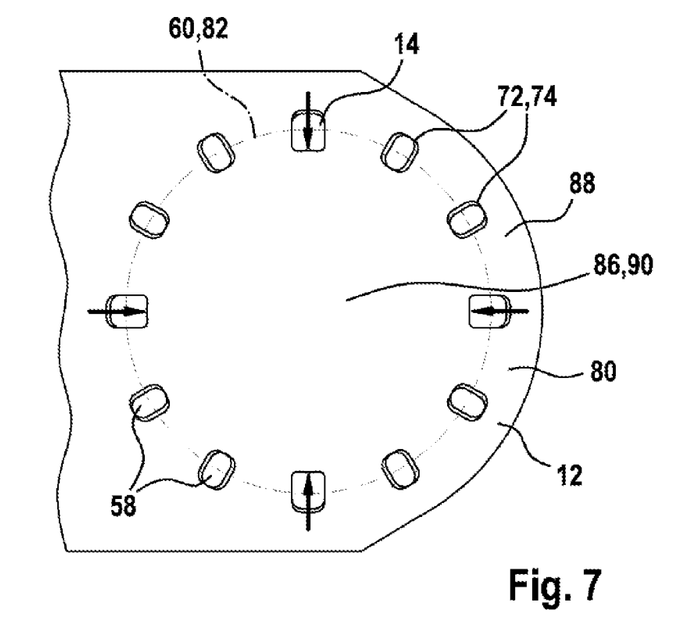
FIG. 7 shows a top view of a detail of the insert tool and FIG. 8 shows a schematic sectional representation of a detail of an alternative tool holder.

The insert tool 12 is formed by a hand-held power tool insert tool (FIG. 6). The insert tool 12, when coupled with the tool holder 10, is provided for a rotational or oscillating movement. The insert tool 12 comprises a machining region 76 which comprises a machining contour 78, such as, for example, cutting elements, sawing teeth or another development which appears sensible to an expert. In addition, the insert tool 12 comprises a fastening region 80 which comprises the fastening elements 74 which are formed by the fastening recesses 72. The machining region 76 and the fastening region 80 extend in two planes which are spaced apart from one another in the axial direction 18, extend in parallel and are connected together by means of a region 92 of the insert tool which extends inclinedly with respect to the planes. The fastening elements 14 are arranged in a circle 82 around a drive axis 84 of the insert tool 12. The fastening region 80, when viewed in the radial direction 30, is realized without any recesses inside the fastening elements 74. When viewed in the radial direction 30, a material section 86 is arranged inside the circularly arranged fastening elements 74. The material section 86 is realized continuously, i.e. it is not interrupted. The fastening region 80 is realized in a plate-shaped manner radially inside the fastening recesses 72.

The fastening elements 74 are surrounded in part by a further material section 88 in the radial direction 30. The fastening elements 74 are surrounded completely by the further material section 88 in the radial direction 30. I.e. the fastening elements 74 are realized in a closed manner in a main plane of extension of the insert tool 12. Perpendicular to the axial direction 18, the fastening elements 74 comprise a rectangular cross section, the corners of which are realized in a rounded manner. The insert tool 12 comprises a total of twelve fastening elements 74 which are formed by the fastening recesses 72.

The fastening region 80 of the insert tool 12 comprises a coding element 90. The coding element 90 is formed by the material section 86. The coding element 90 is provided for the purpose of preventing the insert tool 12 being coupled with a tool holder that is not shown of an unsuitable hand-held power tool. In particular already known oscillating hand-held power tools (not shown) comprise a drive shaft which, in a coupled state, extends in the axial direction 18 beyond the fastening region 80 of the insert tool 12. For this reason, already known oscillating insert tools (not shown) comprise a centering recess which is realized coaxially with respect to the drive axis 84 in addition to the circularly arranged fastening recesses. It is also conceivable for the coding element to include a profiling or an elevation.

In particular, as a result of the material section 86, the insert tool 12 has a higher moment of inertia than the already known oscillating insert tools (not shown). A drive unit, as well as a transforming unit of already known oscillating hand-held power tools are not provided for said higher moment of inertia, as a result of which, when the insert tool 12 is coupled and utilized with one of the already known, not shown oscillating hand-held power tools, it can result in increased wear and in a shortening of the service life of the oscillating hand-held power tool. As a result of the coding element 90 which is formed by the material section 86, coupling of the insert tool 12 with one of the already known, not shown oscillating hand-held power tools is reliably prevented.

The following descriptions and the drawings of the further exemplary embodiments are limited substantially to the differences between the exemplary embodiments, it being possible in principle also to refer to the drawings and/or the description of the first exemplary embodiment with reference to identically designated components, in particular with reference to components with identical references. To differentiate between the exemplary embodiments, the numbers 1 to 2 are placed in front of the references of the further exemplary embodiments.

Figure 8:
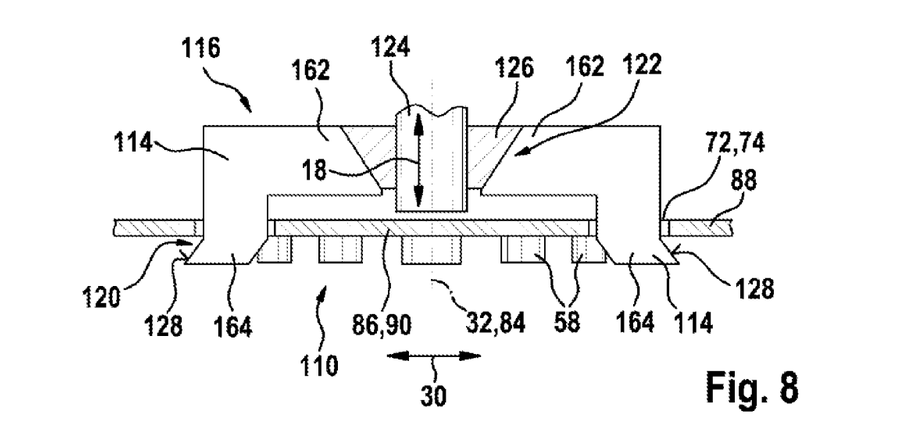

FIG. 8 shows a detail of a tool holder 110. The tool holder 110 comprises a fastening element 114 which is arranged on the holder side and is provided for coupling with the insert tool 12. The tool holder 110 comprises four fastening elements 114 which are arranged on the holder side and are provided for coupling with the insert tool 12. The fastening elements 114 correspond at least substantially to the already described fastening elements 14.

The tool holder 110 comprises a bearing unit 116 (not shown in any more detail) which is provided for the purpose of mounting the fastening elements 114 so as to be displaceable perpendicular to the axial direction 18. The bearing unit 116 includes a linear plain bearing arrangement. The bearing unit 116 is provided for the purpose of mounting the fastening elements 114 so as to be movable in the radial direction 30. The tool holder 110 comprises a clamping element 124 which extends parallel to the axial direction 18. The clamping element 124 comprises a cone-shaped region 126. The cone-shaped region 126 is arranged in the axial direction 18 in a region of the clamping element 124 which faces away from the drive unit 42. The cone-shaped region 126 extends outward in the radial direction 30. A larger diameter of the cone-shaped region 126 is arranged facing the drive unit 42 in the axial direction 18.

The fastening elements 114 comprise a region 162 which faces the drive unit 42 in the axial direction 18, the surface of which region is realized in an inclined manner in relation to the drive axis 32 and thus forms a negative cone shape. The region 162 extends inward in the radial direction 30. The region 162 corresponds with the cone-shaped region 126 of the clamping element 124. The tool holder 110 comprises a transforming unit 122 which includes the cone-shaped region 126 of the clamping element 124 and the region 162 of the fastening elements 114. The transforming unit 122 is provided for transforming a movement in the axial direction 18 into a movement into a direction, which deviates from the axial direction 18, of the fastening elements 114. The transforming unit 122 is provided for transforming a movement in the axial direction 18 into a movement of the fastening elements 114 in the radial direction 30.

The fastening elements 114 comprise a region 164 which faces away from the region 162 and is realized in a pin-shaped manner. The pin-shaped region 164 extends in the axial direction 18 beyond the drive shaft 36 and projects over the drive shaft 36 in the axial direction 18. The fastening elements 114 in each case comprise a transforming face 128 in the pin-shaped region 164. The transforming faces 128 are formed by inclinations which extend in an angular manner with respect to the axial direction 18. The transforming faces 128 form in part a transforming unit 120 of the tool holder 110. The transforming unit 120 is provided for the purpose of transforming a relative movement, which deviates totally from an axial movement, between the insert tool 12 and the fastening element 114 into a clamping force F in the axial direction 18. The transforming unit 120 is provided for the purpose of transforming the relative movement in the radial direction 30 between the insert tool 12 and the fastening element 114 into a clamping force F in the axial direction 18.

The further fastening elements 58 of the tool holder 110 are arranged on an end which is remote from the drive unit 42. The tool holder 110 comprises eight further fastening elements 58. The further fastening elements 58 are arranged in a circle 60 around the drive axis 32 of the drive shaft 36. The fastening elements 114 and the further fastening elements 58 are arranged in the same circle 60 with the same radius. The further fastening elements 58 are realized in a cone-shaped manner.

With the insert tool 12 mounted on the tool holder 110, as a result of the movement of the fastening elements 114 outward in the axial direction 30, the insert tool 12 is clamped on the tool holder 110 by the fastening elements 114 in the axial direction 18 and is held in a captive manner. The movement of the fastening elements 114 outward in the radial direction 30 brings about a clamping force F onto the insert tool 12 in the axial direction 18. As a result, the insert tool 12 is pressed toward the tool holder 110 and is moved in the axial direction 18 along the further, cone-shaped fastening elements 58. With the insert tool 12 totally clamped in the tool holder 110, the further fastening elements 58 abut against the fastening elements 74 of the insert tool 12, which are formed by the fastening recesses 72, in the radial direction 30 and in the circumferential direction 34. The further fastening elements 58 secure the insert tool 12 as a result in the radial direction 30 and in the circumferential direction 34. The fastening elements 114 and the further fastening elements 58 comprise a rectangular cross section, the corners of which are realized in a rounded manner.

Figure 9:
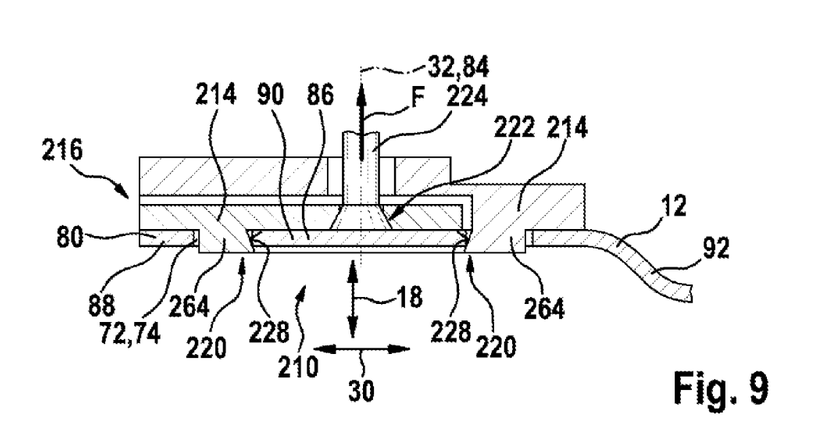
FIG. 9 shows a schematic sectional representation of a detail of another alternative tool holder.

FIG. 9 shows a detail of an alternatively developed tool holder 210. The tool holder 210 comprises a fastening element 214 which is arranged on the holder side and is provided for coupling with the insert tool 12. The tool holder 210 comprises a total of four fastening elements 214 which are arranged on the holder side and are provided for coupling with the insert tool 12. The fastening elements 214 correspond at least substantially to the already described fastening elements 14.

The tool holder 210 comprises a bearing unit 216 (not shown in any more detail) which is provided for the purpose of mounting the fastening elements 214 so as to be displaceable perpendicular to the axial direction 18. The bearing unit 216 includes a linear plain bearing arrangement. The bearing unit 216 is provided for the purpose of mounting the fastening elements 214 so as to be movable in the radial direction 30. The tool holder 210 comprises a clamping element 224 which is not shown in any more detail and extends parallel to the axial direction 18.

The tool holder 110 comprises a transforming unit 222 which includes a transforming contour. The transforming unit 222 is provided for transforming a movement in the axial direction 18 into a movement into a direction, which deviates from the axial direction 18, of the fastening elements 214. The transforming unit 222 is provided for transforming a movement in the axial direction 18 into a movement of the fastening elements 214 in the radial direction 30.

The fastening elements 214 comprise a region 264 which is realized in a pin-shaped manner. The pin-shaped region 264 extends in the axial direction 18 beyond the drive shaft 36 and projects over the drive shaft 36 in the axial direction 18. The fastening elements 214 in each case comprise a transforming face 228 in the pin-shaped region 264. The transforming faces 228 are formed by inclinations which extend in an angular manner with respect to the axial direction 18. The transforming faces 228 form in part a transforming unit 220 of the tool holder 210. The transforming unit 220 is provided for the purpose of transforming a relative movement, which deviates totally from an axial movement, between the insert tool 12 and the fastening element 214 into a clamping force F in the axial direction 18. The transforming unit 220 is provided for the purpose of transforming the relative movement in the radial direction 30 between the insert tool 12 and the fastening element 214 into a clamping force F in the axial direction 18.

With the insert tool 12 mounted on the tool holder 210, as a result of the movement of the fastening elements 214 inward in the axial direction 30, the insert tool 12 is clamped on the tool holder 210 by the fastening elements 214 in the axial direction 18 and is held in a captive manner. The movement of the fastening elements 214 inward in the radial direction 30 brings about a clamping force F onto the insert tool 12 in the axial direction 18. As a result, the insert tool 12 is pressed toward the tool holder 210 and is moved in the axial direction 18 along further, cone-shaped fastening elements 58. With the insert tool 12 totally clamped in the tool holder 210, the further fastening elements 58 abut against the fastening elements 74 of the insert tool 12, which are formed by the fastening recesses 72, in the radial direction 30 and in the circumferential direction 34. The further fastening elements 58 secure the insert tool 12 as a result in the radial direction and in the circumferential direction 34. The fastening elements 214 and the further fastening elements 58 comprise a rectangular cross section, the corners of which are realized in a rounded manner.

It is also conceivable for the fastening elements 14, 114, 214 to be realized so as to be pivotable outward in the radial direction 30 or so as to be displaceable in the circumferential direction or in a tangential manner and, as a result, to bring about a fastening force, which is formed by a clamping force F, onto the insert tool 12 in the axial direction 18.

The invention claimed is:

1. A hand-held power tool, comprising:
   a drive shaft configured to be driven with a driving motion by the power tool;
   a tool holder configured to drive at least one insert tool in an oscillating and/or rotational manner, the tool holder including:
      at least one fastening element configured at least substantially to couple with the at least one insert tool;
      at least one further fastening element that is fixed to the drive shaft and configured to at least substantially pass through and geometrically engage with at least one fastening recess of the at least one insert tool so as to radially and circumferentially secure the at least one insert tool to the tool holder and to transmit the driving motion of the drive shaft to the at least one insert tool via the geometric engagement; and
      at least one bearing unit configured to mount the at least one fastening element so as to be movable into a movement which deviates at least in part from an axial direction,
   wherein the movement, which deviates at least in part from the axial direction, of the at least one fastening element is configured at least substantially to generate a fastening force in the axial direction.

2. The hand-held power tool as claimed as claim 1, wherein the at least one fastening element defines at least one transforming face that is configured to engage at least one fastening recess of the at least one insert tool in a direction of the movement, and that is oriented at an angular inclination relative to the axial direction such that the transforming face transforms the movement into a fastening force, formed at least substantially by a clamping force, in the axial direction as the transforming face engages the at least one fastening recess of the at least one insert tool.

3. The hand-held power tool as claimed as claim 1, wherein the at least one fastening element includes a transforming region having a concave cone shape,
   the tool holder further including at least one clamping element that has at least one cone-shaped region, and that is configured to move axially so that the cone-shaped region engages the concave cone shape of the at least one fastening element to transform movement of the at least one clamping element in the axial direction into the movement of the at least one fastening element that deviates from the axial direction.

4. The hand-held power tool as claimed as claim 1, wherein the at least one bearing unit is configured to mount the at least one fastening element so as to be movable at least in part into a radial direction relative to a drive axis.

5. The hand-held power tool as claimed as claim 1, wherein the at least one bearing unit is configured to mount the at least one fastening element so as to be pivotable at least in part.

6. The hand-held power tool as claimed as claim 1, wherein the at least one fastening element is configured to project over the drive shaft at least substantially in the axial direction.

7. The hand-held power tool of claim 1, wherein:
   the at least one fastening element defines at least one first transformation surface and at least one second transformation surface, the at least one second transformation surface configured to at least substantially pass through the at least one fastening recess of the at least one insert tool in a coupled position of the at least one insert tool;
   the tool holder further includes at least one clamping element that is mounted so as to be axially displaceable and that defines at least one third transformation surface;
   the at least one third transformation surface is configured to engage with the at least one first transformation surface as the at least one clamping element is axially displaced to move the at least one fastening element along the movement; and
   the movement is configured to cause the at least one second transformation surface to engage the at least one fastening recess of the at least one fastening element and generate the fastening force in the axial direction.

* * * * *